United States Patent [19]
Sohn

[11] Patent Number: 5,124,623
[45] Date of Patent: Jun. 23, 1992

[54] SPEED CONTROL CIRCUIT FOR A SERVO MOTOR

[75] Inventor: Jeong K. Sohn, Seoul, Rep. of Korea

[73] Assignee: Goldstar Co., Ltd., Seoul, Rep. of Korea

[21] Appl. No.: 560,738

[22] Filed: Jul. 31, 1990

[30] Foreign Application Priority Data

Jul. 31, 1989 [KR] Rep. of Korea ............... 10992/1989

[51] Int. Cl.$^5$ ....................... G05B 11/28; H02P 07/36
[52] U.S. Cl. .................................... 318/599; 318/603; 318/606
[58] Field of Search ............... 318/599, 811, 600, 601, 318/603, 604, 606, 608; 388/811, 912, 809, 910

[56] References Cited

U.S. PATENT DOCUMENTS

| | | | |
|---|---|---|---|
| 3,742,326 | 6/1973 | Okuda et al. | 318/603 |
| 4,259,626 | 3/1981 | Nomura et al. | 318/599 |
| 4,283,671 | 8/1981 | Nakano et al. | 318/608 |
| 4,360,767 | 11/1982 | Akiyama et al. | 388/912 |
| 4,441,061 | 4/1984 | Yoshida et al. | 388/912 |
| 4,885,793 | 12/1989 | Tabuchi | 388/912 |

Primary Examiner—William M. Shoop, Jr.
Assistant Examiner—John W. Cabeca

[57] ABSTRACT

A speed control circuit for a servo motor for counting frequencies generated in response to a revolution of the servo motor and for converting the frequency to a control voltage of the servo motor, including a controller for receiving a basic clock signal after outputting a latch control signal every period of a frequency generator signal and for outputting a load signal following a period of the basic clock signal, a counter for counting the basic clock signal after loading an initial value once the load signal is output from the controller, a latch for latching the counted value of the counter when the latch control signal is output from the controller, a digital/analog converter for converting the counted value latched to an analog signal a, and a speed error control ouput section for performing buffer amplification on the analog signal and for outputting a as a speed error control signal the buffer amplified analog signal.

2 Claims, 3 Drawing Sheets

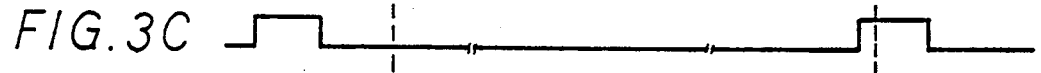
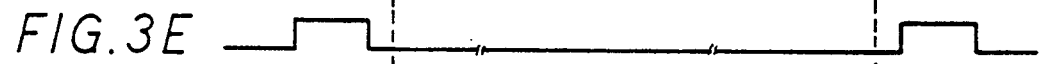
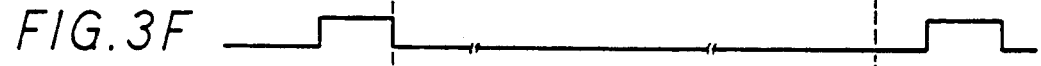
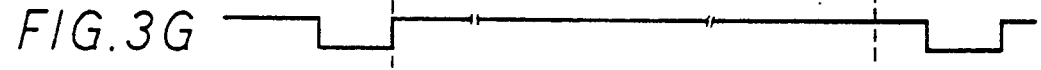

SPEED CONTROL CIRCUIT FOR A SERVO MOTOR

BACKGROUND OF THE INVENTION

1. Field of the Invention

The present invention relates to a speed control circuit for a servo motor and more particularly, to a speed control circuit for a servo motor which counts frequencies generated in response to a revolution of the servo motor and converts the frequency to a control voltage of the servo motor.

2. Description of the Prior Art

FIG. 1 is a block diagram of a conventional speed control device for a servo motor. As shown in FIG. 1, the conventional control section 1 receives inputs of a clock signal hereinafter CLK and a frequency generator signal hereinafter FG which are generated in response to a revolution of the servo motor a a speed detecting counter 2 for counting periods of the FG a latch section 3 for latching an output signal of the speed detecting counter 2 with a first control signal from the control section 1, a pulse width modulation signal generating section 4 for carrying out a pulse width modulation over the output signal of the latch section 3 with a control signal from second the control section 1, and a low pass filter 5 for passing only a low band signal of the output signals of the pulse width modulation signal generating section 4. When the FG is inputted to the control section 1, a preset signal is outputted and then applied to the speed detecting counter 2. Accordingly, the speed detecting counter 2 counts the periods of the FG by counting the CLK passing through the control section 1, the count signal is latched in the latch section 3 by a latch control signal of the control section 1, and a pulse width modulation is carried out over the output signal of the latch section 3 at the pulse width modulation signal generating section 4 and then the modulated output signal is outputted as a speed error signal through the low pass filter 5. However, such a conventional device has drawbacks in that it has intricate structures and cannot perform a speed control of the servo motor since a phase delay is made by outputting as an analog signal for controlling the speed error after a removal of carrier components by passing a speed control pulse width modulation signal through the low pass filter.

SUMMARY OF THE INVENTION

Accordingly, it is an object of the present invention is to provide a speed control circuit for a servo motor which can control the speed error of the servo motor exactly without a phase delay by detecting the speed of the servo motor.

Another object of the present invention is to provide a speed control circuit for a servo motor which has simple structure for outputting a speed error control voltage in accordance with a detecting speed of a servo motor without a low pass filter and a pulse width modulation signal generator.

A further object of the present invention is to provide a speed control circuit for a servo motor which counts basic clock signals during periods of the frequency generator signal, latches the count number in the latch section, converts the latched signal to an analog signal, and outputs the analog signal as a speed error control signal.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a speed control circuit of a servo motor for counting frequencies generated in response to a revolution of a servo motor and converts the frequency to a control voltage of the servo motor, which includes a controller for passing a basic clock signal after outputting a latch control signal every period of a frequency generator signal and for outputting a load signal following a period of the basic clock signal, a counter for counting the basic clock signal passing the controller through after loading an initial value when the load signal is outputted from the controller, a latch for latching the counted value of the counter when the latch control signal is outputted from the controller, a digital/analog converter for converting the counted value latched in the latch to an analog signal, and a speed error control output section for outputting as a speed error control signal by performing a buffer amplification of the output signal of the digital/analog converter.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 shows waveforms for each of the sections of FIG. 2.

DESCRIPTION OF THE PREFERRED EMBODIMENTS

Figure 1:
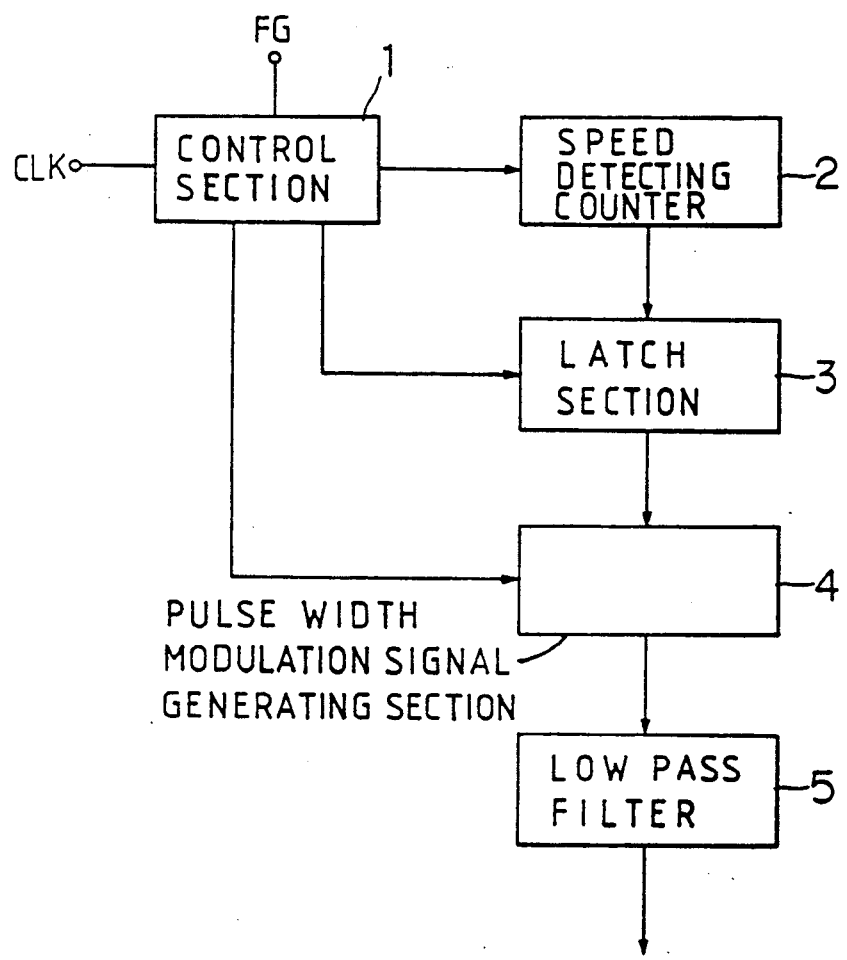
FIG. 1 is a block diagram for a speed control device for a conventional servo motor.
Figure 2:
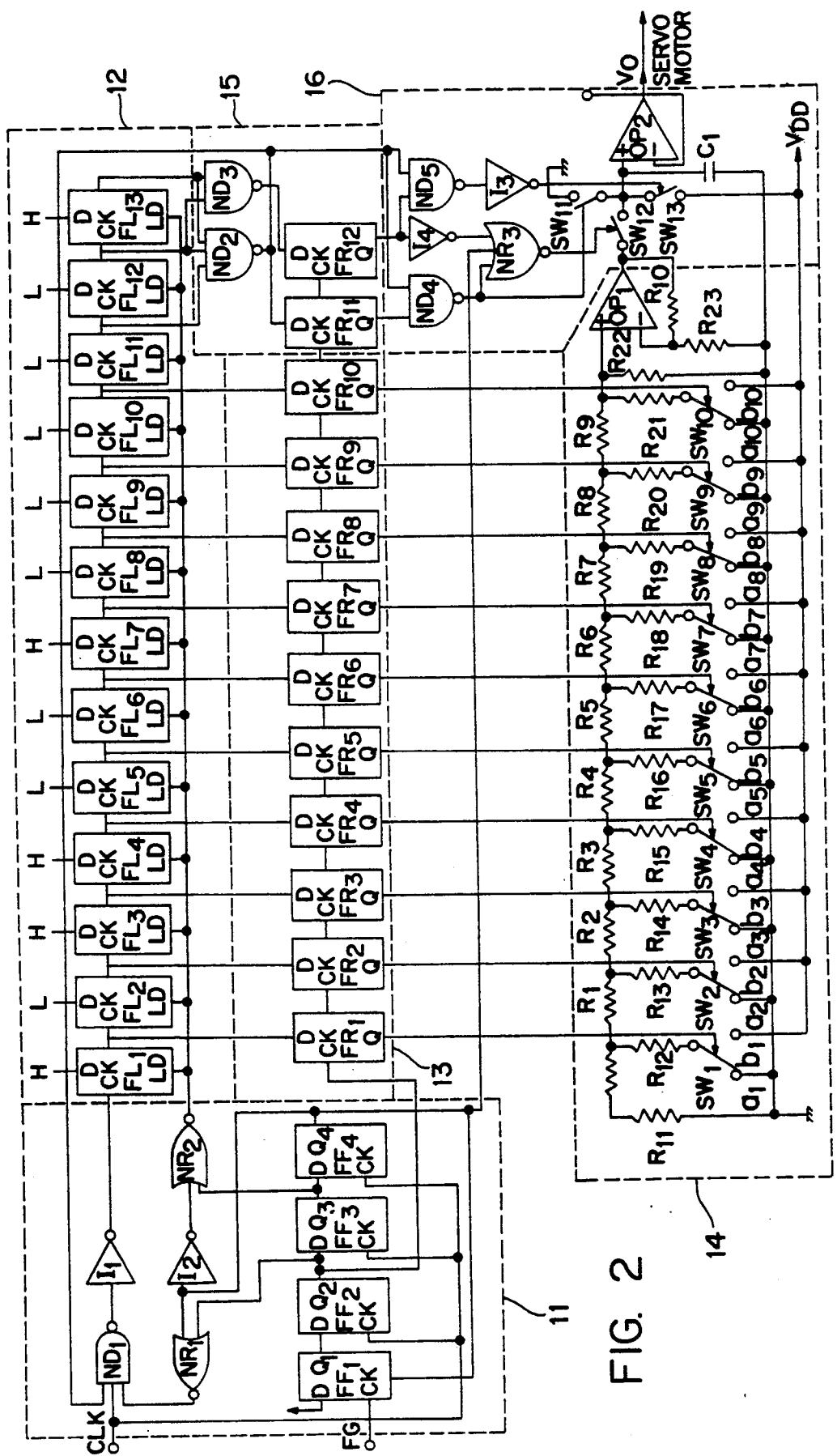
FIG. 2 shows a speed control circuit for a servo motor according to the present invention.

Referring now in detail to the drawings for the purpose of illustrating preferred embodiments of the present invention, the speed control circuit for a servo motor as shown in FIG. 2 comprises a control section 11 constructed by connecting a frequency generator signal (FG) to a clock terminal (CK) of a flip flop FF, connecting the basic clock signal (CLK) commonly to clock terminals of flip flops FF2–FF3 and an input terminal of a NAND gate ND1, connecting output terminals Q1–Q3 of the flip flops FF1–FF3 to an input terminal (D) of the flip flops FF2–FF4, connecting output terminals Q2, Q4 of the flip flops FF2, FF4 to the other input terminal of the said NAND gate ND1 through a NOR gate NR1, connecting an output terminal Q4 of said flip flop FF4 to a reset terminal (R) of the flip flop FF1 while an inverter I2 is connected to an input terminal of NOR gate NR2, connecting an output terminal Q3 of the flip flop FF3 to the other input terminal of the NOR gate NR2, and connecting an output terminal of the NAND gate ND1 to an input terminal of the inverter I1. A counter section 12 is constituted by connecting the output terminal of the inverter ±1 which is a count clock signal output terminal of the control section 11 to a clock terminal of a flip flop FL1, connecting commonly the output terminal of the NOR gate NR2 which is a load signal output terminal to a load terminal (LD) of the flip flops FL1-FL13, and connecting output terminals (Q) of the flip flops FL1-FL12 respectively to clock terminals (CK) of the flip flops FR2-FR13. A latch section 13 is constituted by connecting an output terminal Q2 of the flip flop FF2, which is a latch signal output terminal of the control section 11, commonly to a clock terminal (CK) of the flip flops FR1-FR10, and connecting the output terminals (Q) of the flip flops FL1-FL10 of the counter section 12 respectively to input terminals (D) of the flip flops FR1-FR10. And also, a digital/analog converting section 14 is constructed by connecting a grounded resistor R11 to a resistor R22 and a non-inverting input terminal of an operational amplifier OP1 through resistors F1-F9 while connecting said resistors R11, R1-R9, R22 respectively to resistors R12-R21 through switches SW1-SW10, connecting terminals a1-a10 of the switches SW1-SW10 to the ground, connecting terminals b1-b10 of the switches SW1-SW10 to the power source (VDD), and connecting the section 13 to control terminals of the switches SW1-SW10.

A low speed detecting latch section 15 is constituted by connecting output terminals (Q) of the flip flops FL11-FL13 of the counter section 12 to an input terminal (D) of the flip flop FR11 and the other input terminal of NAND gate ND1 of the control section 11 through the NAND gate ND2, connecting the output terminal Q of said flip flops FL12, FL13 to the input terminal (D) of the flip flop FR12 through the NAND gate ND3, and connecting the output terminal Q2 of the flip flop FF2 of said control section 11 commonly to the clock terminals (CK) of said flip flops FR11, FR12. And also, a speed error control outputting section 16 is constructed by connecting an output terminal of an operation amplifier OP1 which is an output terminal of the digital/analog converting section 14 to a capacitor C1 and the non-inverting input terminal of an operational amplifier OP2 through a switch SW12 and then to the ground and power terminal (VDD) through switches SW11, SW13, connecting an output terminal (Q) of the flip flop FR11 of said low speed detecting latch section 15 and an output terminal of the NAND gate ND1 to a control terminal of the switch SW11 through a NAND gate ND4, connecting an output terminal (Q) of the flip flop FR12 and an output terminal of the NAND gate ND2 to a control terminal of a switch SW13 through an NAND gate ND5 and an inverter I3, and connecting an output terminal (Q) of the flip flop FR12 through an inverter I4, an output terminal Q4 of the flip flop FF4 of the control section 11, and an output terminal of the NAND gate ND4 to a control terminal of the switch SW12 through a NOR gate NR3.

The operations and effects of the present invention having such a configuration will be described below in detail with reference to the waveforms in FIG. 3. The basic clock signal (CLK) applied to the control section 11 uses a color carrier frequency fcs/2. When the basic clock signal (CLK) is applied as shown in FIG. 3A, the basic clock signal (CLK) is applied to the clock terminals (CK) of the flip flops FF2-FF4. Accordingly, at this time, when a frequency generator signal (FG) generated according to a revolution of a servo motor is applied as shown in FIG. 3B, the flip flop FF1 is clocked at the falling edge of the frequency generator signal (FG), a high potential of the power terminal (VDD), which is applied to the input terminal (D) of the flip flop FF1 is, as shown in FIG. 3C, to the output terminal Q1 of the flip flop FF1, and applied to the input terminal D of the flip flop FF2.

Accordingly, thereafter, a high potential signal from the output terminal Q1 of the flip flop FF2 is outputted at the falling edge of the basic clock signal (CLK) as shown in FIG. 3D and applied to the input terminal (D) of the flip flop FF3.

According to this, thereafter, a high potential signal from the output terminal Q3 of the flip flop FF3 is outputted a the falling edge of the basic clock signal (CLK) as shown in FIG. 3E and applied to the input terminal (D) of the flip flop FF4.

Thereafter, a high potential signal from the output terminal Q4 of the flip flop FF4 is outputted at the falling edge of the basic clock signal (CLK) as shown in FIG. 3F and applied to the reset terminal (R) of the flip flop FF1 to reset the filing flop FF1, so that a low potential signal is outputted as shown in FIG. 3C.

Accordingly, a low potential signal is sequentially outputted from the output terminals Q2, Q3, Q4 of the flip flops FF2, FF3, FF4 as shown in FIGS. 3D, 3E and 3F.

As a result, a high potential signal is sequentially outputted from the output terminals Q2, Q3, Q4 of the flip flops FF2, FF3, FF4 during 3 periods of the basic clock signal (CLK) after the frequency generator signal (FG) becomes a low potential. And also, when a high potential signal from the output terminal Q4 of the flip flop FF4 is outputted as above, the high potential signal is inverted to a low potential signal through the inverter I2 as shown in FIG. 3G and applied to an input terminal of a NOR gate NR2. In such a state, when a low potential signal from an output terminal (Q) of the flip flop FF3 is outputted as shown in FIG. 3E, a high potential signal is outputted form the output terminal of the NOR gate NR2 as shown in FIG. 3H and applied to a load terminals (LD) of the flip flops FL1-FL13 as a load signal. According to this, the flip flops FL1-FL13 load an initial value which is applied to an input terminals of the flip flops FL1-FL3, and the initial value is respectively applied to the output terminals.

And also, as mentioned above, in case that a high potential signal is outputted at an output terminal (Q) of the flip flop FF2 or at an output terminal Q4 of the flip flop FF4, a low potential signal is outputted from the output terminal of the NOR gate NR1. According to this, a high potential signal is outputted from the NAND gate ND1 as shown in FIG. 3J regardless of any signal applied to other input terminals. That is, the basic clock signal (CLK) does not go to the NAND gate ND1 during 5 period of the basic clock signal (CLK) which a low potential signal is outputted from the NOR gate NR1. Thereafter, when a high potential signal is outputted from the NOR gate NR1, the basic clock signal (CLK) is inverted through the NAND gate ND1 and outputted as shown in FIG. 3J, and then the inverted basic clock signal is inverted again through the inverter I1 and applied to an clock terminal (CK) of the flip flop FL1 as shown in FIG. 3K. As mentioned above, according as the basic clock signal (CLK) is applied to the counter section 12, the flip flops FL1-FL13 count from the initial value loaded as above and output to their output terminals, respectively.

When the frequency generator signal (FG) becomes a falling edge again as shown in FIG. 3B during counting as described above, a high potential signal is outputted at the output terminal Q1 of the flip flop FF1 as shown in FIG. 3C. According to this, output terminals Q2, Q3, Q4 of the flip flops FF2, Ff3, Ff4 sequentially become a high potential signal as shown in FIGS. 3D, 3E, and 3F. As mentioned above, when a high potential signal is outputted to the output terminal Q2 of the flip flop FF2, no further counting is performed with no application of the basic clock signal (CLK) to the counter section 12 since a low potential signal is outputted from the NOR gate NR1. As a result, the counter section 12 begins counting the basic clock signal (CLK) from the initial value after a stop duration of 5 periods of the basic clock signal (CLK) since the frequency generator signal (FG) becomes a falling edge, and, thereafter, stops the counting when the frequency generator signal (FG) becomes a falling edge again. During stopping the counting as described above, a count signal of said counter section 12 is latched in the latch section 13. That is, when a low potential signal is outputted from the output terminal Q2 of the flip flop FF2, output signals of the flip flops FL1-FL10 in the counter section 12 which are a 10-bit counter signal are respectively latched in the flip flops FR1-FR10 of the latch section 13, and outputted to the output terminals of said flip flops FR1-FR10. The output signals from the flip flops FR1-FR10 in the latch section 13 are applied to the switches SW1-SW10 of the digital/analog converting section 14 to connect the switches SW1-SW10 to the terminals a1-a10 or to the terminals b1-b2. As a example, the switch SW1 is connected to the terminal a1 when the output signal of the flip flop FR1 is a high potential signal, and connected to the terminal b1 when the output signal of the flip flop FR1 is a low potential. In the same manner as described above, the switches SW1-SW10 are respectively connected to the terminals a2-a10 or to the terminals b2-b10 according as the output signals of the flip flops FR2-FR10 are a high or a low potential. According to this, the 10-bit signal from the latch section 13 is converted to an analog signal through the digital/analog converting section 14 and outputted to the output terminal of the operational amplifier OP1. That is, provided that the resistance values of the resistors R1-R10 of the digital/analog converting section 14 are the same, the resistance values of the resistors R11-R23 double those of said resistors R1-R10, and the value of the 10-bit signal value Z is converted to an analog signal of VDD/1024 (1023-Z) through the digital/analog converting section 14 and outputted to the output terminal of the operational amplifier OP1.

On the other hand, in case that high potentials are not outputted from all of the flip flops FL11-FL13 which are used for an upper counter in the counter section 12, high potential signals are outputted from the NAND gates ND2, ND3 and applied to the input terminals of the flip flops FR11, FR12. According to this, when a low potential signal is outputted from the flip flop FF2 as described above, high potential signals applied to input terminals (D) of the flip flops FR11, FR12 are latched and outputted to their output terminals (Q). Accordingly, at this time, a low potential signal from the NAND gate ND4 is applied to the input terminal of the NOR gate NR3 to open the switch SW11, a low potential signal from the NAND gate ND5 is inverted to a high potential signal through the inverter I3 to short-circuit the switch SW13, and also, at this time, a high potential signal from the output terminal (Q) of the flip flop FR12 is inverted to a low potential signal through the inverter I4 and applied to the input terminal of the NOR gate NR3. Accordingly, at this time, in the state that a low potential signal from the output terminal Q4 of the flip flop FF4 is outputted as described above, a high potential signal is outputted from the NOR gate NR3 to short-circuit the switch SW12. According to this, the analog signal from the digital/analog converting section 14 is outputted to the output terminal (VO) as a speed error controlling signal through the switch SW12 and the operational amplifier OP2, as described above.

However, since the period of the frequency generator signal (FG) being generated according to a revolution of the servo motor is too late, a low potential signal is outputted from the NAND gates ND2, ND3 when high potential signals are outputted from all of the flip flops FL11-FL13 which are used for an upper counter of the counter section 12, cutting off an application of the basic clock signal (CLK) to the counter section 12 because the low potential signal from the NAND gate ND2 is applied to an input terminal of the NAND gate ND1. And also, at this time, the switch SW11 is short-circuited since the low potential signal from the NAND gate ND2 is inverted to a high potential signal through the NAND gate ND4, the switch SW12 is opened since a low potential signal from the NAND gate ND5 is outputted. And also, a high potential signal is outputted from the NAND gate ND5 by a low potential signal from the NAND gate ND2, and the high potential signal is inverted to a low potential signal through the inverter I3, causing the switch SW13 to be opened. As a result, at this time, the ground potential signal is outputted as a speed error controlling signal through the operational amplifier OP2. And also, the low potential signals from the NAND gates ND2, ND3 are latched in the flip flops FR11, FR12 and outputted when a low potential signal is outputted for the flip flop FF2.

As described above in detail, the present invention provides an exact control of a speed of a servo motor without a phase delay since the present invention counts the periods of the frequency generator signal which are generated according to a revolution of a servo motor with a count of the basic clock signal, latches the counted value and converts directly the latched value to an analog signal for outputting as a speed error controlling signal. According to this, the present invention has simple structures as well as the effects which can rapidly control a speed of a servo motor to a normal speed since the ground potential is outputted as a speed error controlling signal in case that the period of the frequency generator signal becomes late due to a late revolution speed of a servo motor.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A speed control circuit for a servo motor comprising:
   control means for receiving a basic clock signal and a frequency generator signal generated by a revolution of a servo motor and for outputting a latch control signal every period of the frequency generator signal, a load signal following a predetermined period of the basic clock signal, and the basic clock signal;

counting means for receiving the load signal from said control means, reading an initial value contained therein and counting a number of pulses received from the basic clock signal once the initial value has been output by said control means;

latching means for latching a counted value equal to the number of pulses counted from the load signal, once the the latch control signal has been output by said control means;

digital/analog converting means for converting the counted value latched by said latching means to an analog signal; and speed error control outputting means for receiving the analog signal, for performing buffer amplification, and for outputting the buffer amplified analog signal as a speed error control signal.

2. The speed control circuit for a servo motor of claim 1, further comprising low speed detecting latch means for providing the basic clock signal to said counting means when the counted value is greater than a predetermined value by detecting the counting value, and for allowing a ground potential to be output by said speed error control outputting means by latching a detection signal greater than the predetermined value.

* * * * *